(12) United States Patent
Brocco

(10) Patent No.: US 7,770,575 B2
(45) Date of Patent: Aug. 10, 2010

(54) MULTIWARE SAWING MACHINE FOR THE CUTTING OF MATERIAL IN BLOCK FORM

(75) Inventor: Emilio Brocco, Lessolo (IT)

(73) Assignee: Co.Fi.Plast S.r.l., Lessolo (Torino) (IT)

( * ) Notice: Subject to any disclaimer, the term of this patent is extended or adjusted under 35 U.S.C. 154(b) by 306 days.

(21) Appl. No.: 12/067,107

(22) PCT Filed: Sep. 26, 2006

(86) PCT No.: PCT/IB2006/002664
§ 371 (c)(1),
(2), (4) Date: Mar. 17, 2008

(87) PCT Pub. No.: WO2007/036784
PCT Pub. Date: Apr. 5, 2007

(65) Prior Publication Data
US 2008/0257329 A1  Oct. 23, 2008

(30) Foreign Application Priority Data
Sep. 27, 2005  (IT) .......................... TO2005A0669

(51) Int. Cl.
*B28D 1/08* (2006.01)
(52) U.S. Cl. ........................ 125/21; 451/296; 83/813
(58) Field of Classification Search ........... 125/16.01, 125/16.02, 21, 22; 451/296; 83/661, 830, 83/813, 809
See application file for complete search history.

(56) References Cited

U.S. PATENT DOCUMENTS

| | | | | |
|---|---|---|---|---|
| 508,825 A * | 11/1893 | Jeansaume | ................... | 125/21 |
| 1,043,433 A * | 11/1912 | Jackson | ....................... | 125/21 |
| 2,795,222 A * | 6/1957 | Garrison | ...................... | 125/21 |
| 4,067,312 A * | 1/1978 | Tessner | ....................... | 125/21 |
| 5,690,092 A * | 11/1997 | Ogyu | ........................... | 125/21 |
| 6,513,514 B1 | 2/2003 | Micheletti | | |

FOREIGN PATENT DOCUMENTS

| | | |
|---|---|---|
| EP | 1 055 498 A2 | 11/2000 |
| WO | WO 93/14914 | 8/1993 |

* cited by examiner

*Primary Examiner* — Robert Rose
(74) *Attorney, Agent, or Firm* — Hahn & Voight PLLC; Jason D. Voight

(57) ABSTRACT

The sawing machine according to the invention comprises a double portal structure (11) with two pairs of uprights (11.1), along which slides a respective ram (13). The rams (13) bear four support shafts (15), superposed in pairs and each supporting a coaxial roller, respectively a plurality of coaxial pulleys (18), mutually juxtaposed in packet fashion, having coplanar races according to respective vertical planes. A shaft (15) rotates integrally with the respective roller, or with the respective packet of pulleys (18). The other rollers, or packets of pulleys (18) are idle. On sets of four coplanar races is wound a corresponding wire or cutting tool (19) in closed loop, to execute the cut in a corresponding vertical plane of a block of material (B).

12 Claims, 5 Drawing Sheets

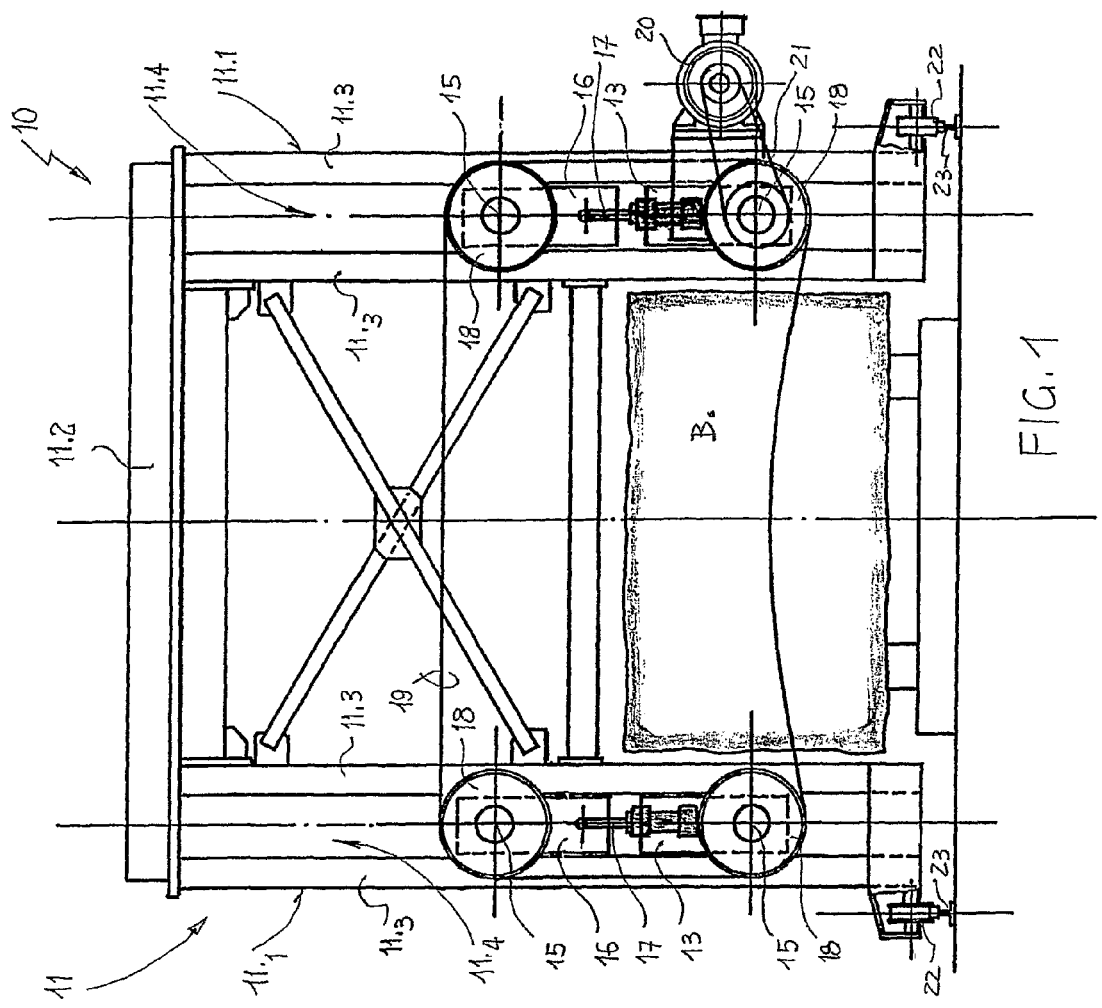
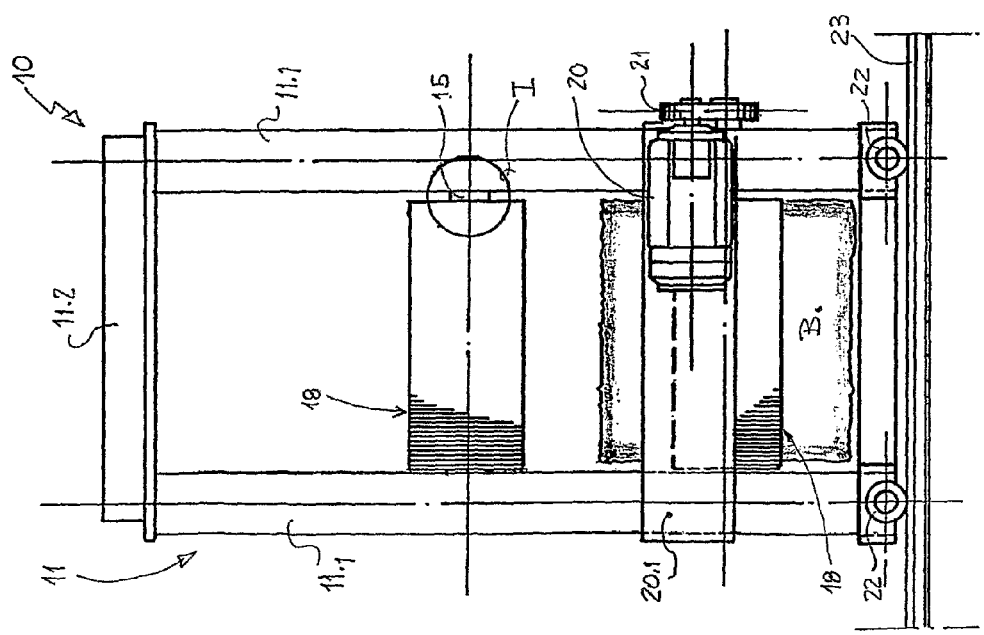

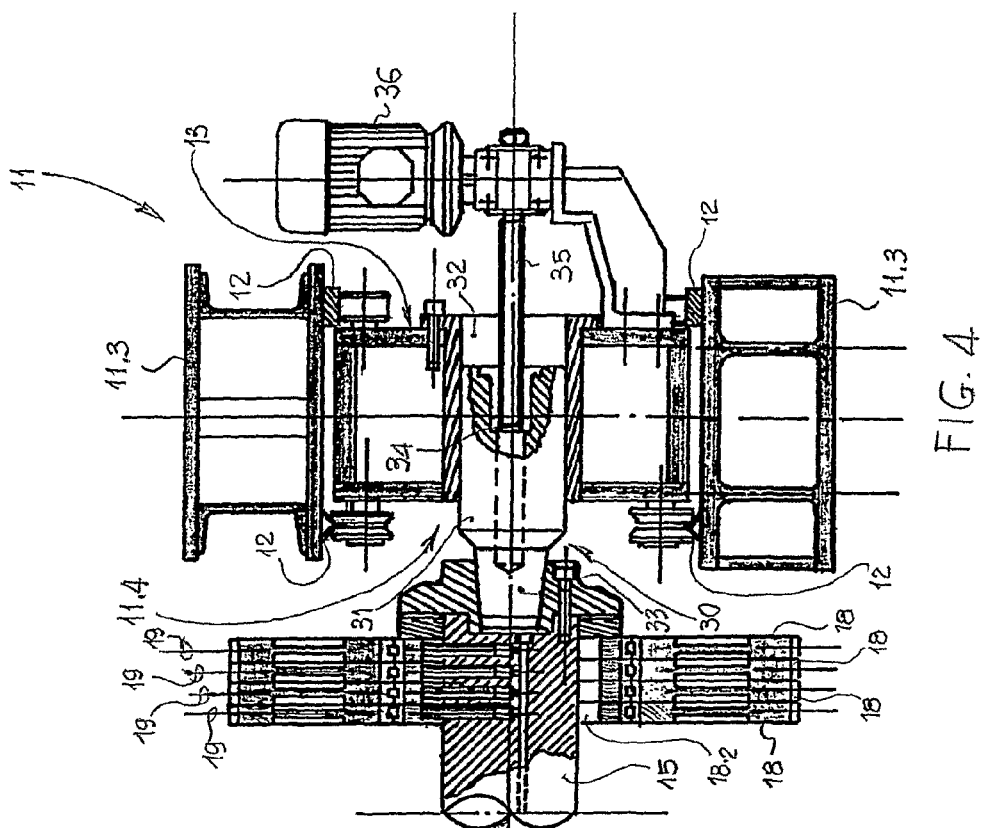
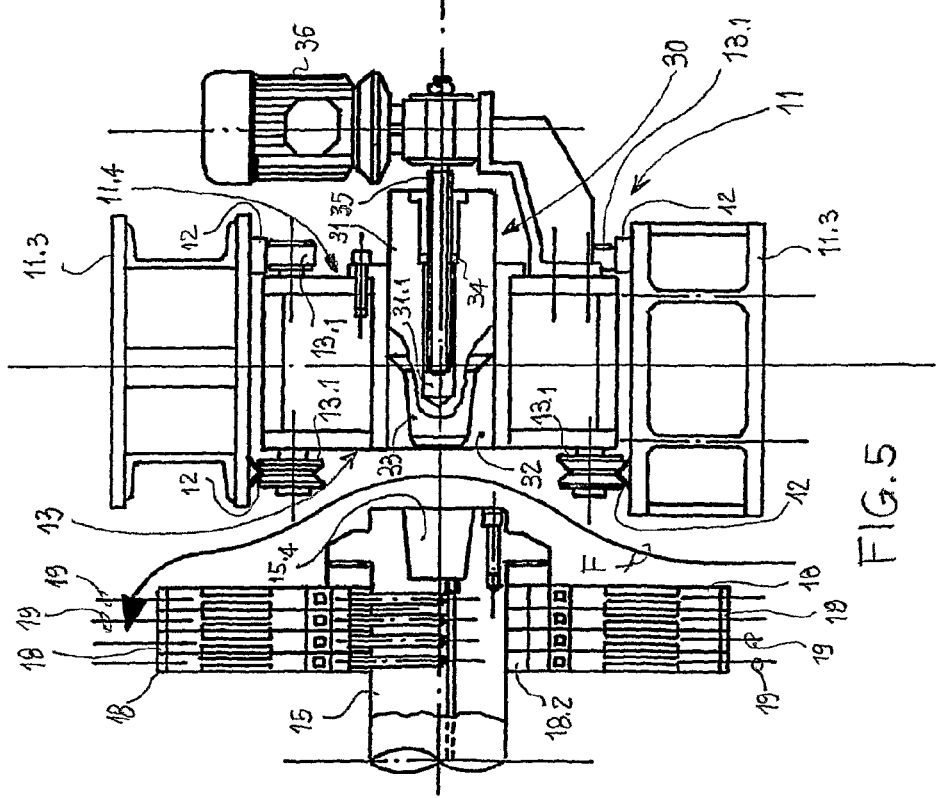

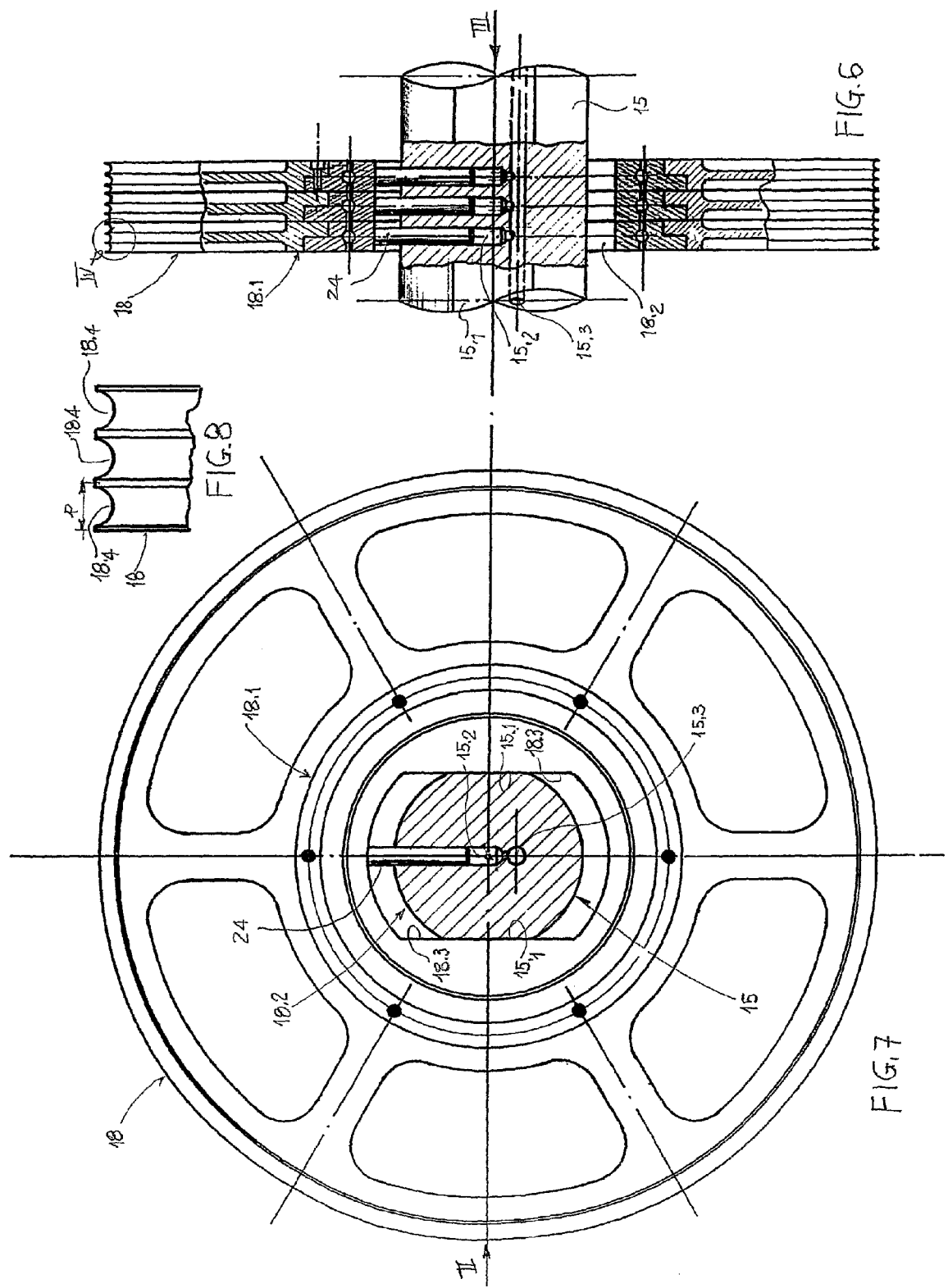

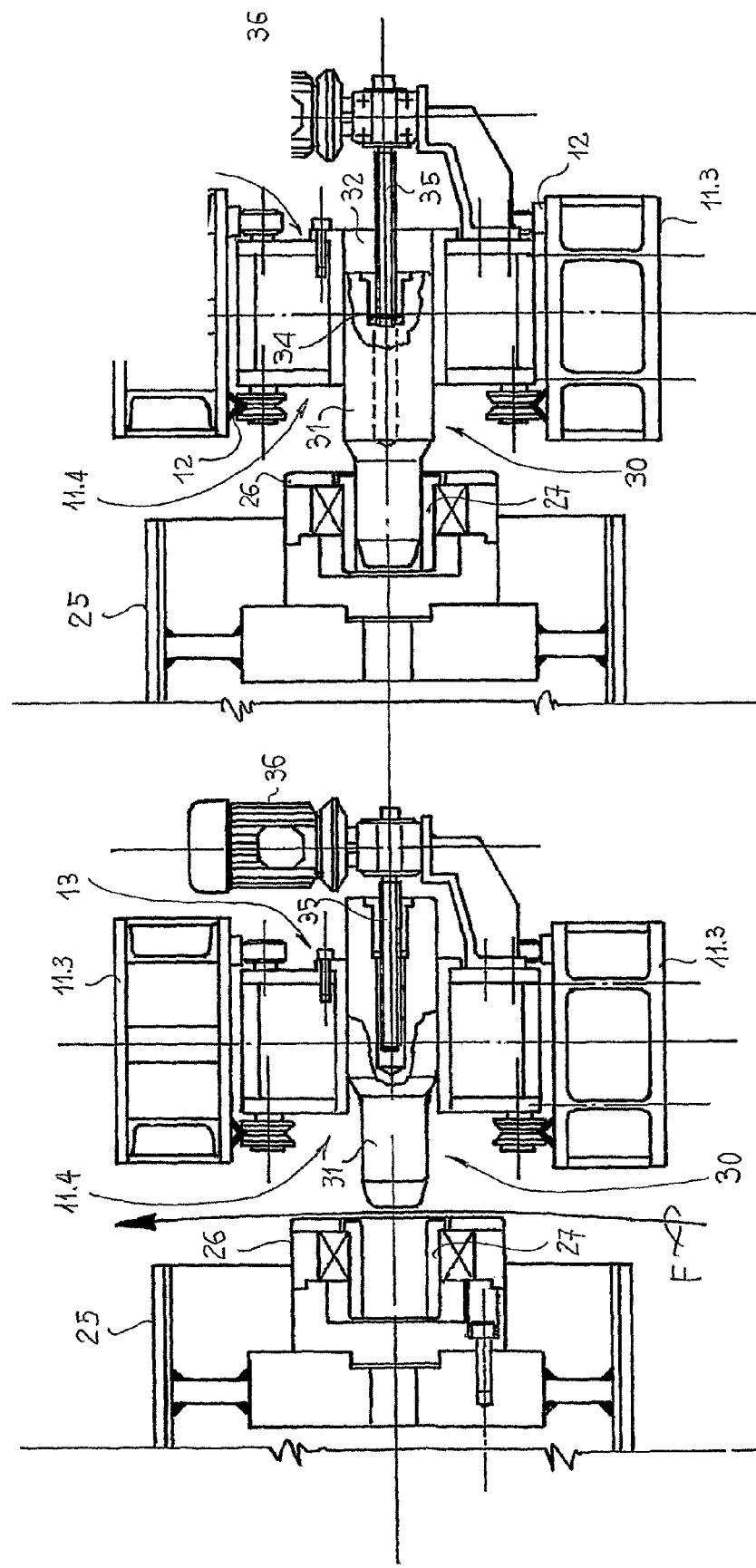

MULTIWARE SAWING MACHINE FOR THE CUTTING OF MATERIAL IN BLOCK FORM

This is a National Stage Application under 35 U.S.C. 371, of PCT/IB2006/002664, filed Sep. 26, 2006.

The present invention relates to a multiwire sawing machine for the cutting of material in block form, e.g. stone material.

Sawing machines for cutting stone material, over the years, have increasingly been oriented toward the technology of the diamond wire cutting tool, which is gradually replacing the obsolete and polluting frames with reciprocating blades.

The construction of the machines that use the diamond wire as a tool has progressively evolved, starting with the so-called "single-wire" machines and then moving on to the so-called "multiwire" machines, i.e. sawing machines with a plurality of cutting tools constituted by closed-loop diamond wires, wound on corresponding rollers or "packets" of drive and transmission wheels or pulleys.

Some builders have already produced "multiwire" sawing machines with 60 cutting diamond wires, in which the rollers or the drive and transmission wheels are mounted in overhang, in order to allow the insertion of the closed-loop diamond wires aboard the machine. However, this type of construction has a considerable drawback from the structural viewpoint, because due to the large dimensions of the rollers or of the wheels or pulleys supported in overhang, high torques and flexing moments are originated, which force to over-dimension the supports, the bearings, the shafts and the attachments of the wheels, and considerably to strengthen the support structures. For this reason, when there are more than 30-40 cutting wires, the ideal solution, from the mechanical and structural viewpoint, is to support the rollers or the wheels at the two ends of their axes. In this way, due to the symmetrical solution rule, the dimensioning of shafts, bearings and supports is considerably reduced and the machine acquires a notable dynamic-structural balance.

However, a severe drawback of this constructive solution is constituted by the difficulty of uniforming the different length of the closed loop cutting wires mounted in the machine on the rollers or "packets" of wheels or pulleys (three idle and a driving one for each wire), which have circumferential grooves or races within which the diamond wires are housed. To have the same value of tension on all wires, it is essential that the wires have identical development and elastic elongation. From the mechanical viewpoint, this condition is practically unachievable.

Another severe drawback of the aforesaid constructive solution is the impossibility of frontally loading the diamond wires already formed in closed loop on the rollers or on the "packets" of wheels or pulleys, hence having either to partially disassemble the machine or to connect the free ends of linear diamond wire aboard the machine, thereby forming them in closed loop, after winding them on the rollers or on the wheels or pulleys with races. This operation entails a heavy technical and economic expense. The present invention, starting from the notion of these drawbacks, is aimed at overcoming them.

One object of the present invention is to provide a multiwire sawing machine for the cutting of material in block form, e.g. stone material, in which the rollers or the drive and transmission wheels or pulleys of the cutting wires are support at the two ends of their axis, in order to provide the machine with good dynamic-structural balance.

Another object of the invention is to provide a sawing machine as specified, in which the constructive differences of the cutting wires mounted in place in closed loop on the rollers or on the wheels or pulleys can be at least partially compensated, thereby having in operation all cutting wires having substantially the same tensioning value.

A further object of the invention is to provide a sawing machine as indicated, in which the cutting wires already formed in closed loop can, e.g. for maintenance purposes, be removed and wound on rollers or on the wheels or pulleys in simple, rapid fashion.

In view of these objects, the present invention provides a multiwire sawing machine for the cutting of material in block form, e.g. stone material, whose characteristics are described in appended claims.

Said claims are understood to be wholly incorporated herein.

The present invention shall be more readily apparent from the detailed description that follows, with reference to the accompanying drawings, provided purely by way of example, in which:

FIG. 1 is a front elevation view of the multiwire sawing machine for the cutting of material in block form, e.g. stone material, according to an exemplifying embodiment of the invention;

FIGS. 2 and 3 are respectively lateral elevation and top plan views of the sawing machine of FIG. 1;

FIGS. 4 and 5 are respectively cross section and plan detailed, enlarged scale views of the detail I of FIG. 2, respectively in the working and resting position of the sawing machine;

FIG. 6 is a detailed, enlarged scale view, taken in the direction of the arrow II of FIG. 7 and showing a part of a support shaft with some pulleys mounted coaxial of the sawing machine of FIG. 1, FIG. 7 is a view in the direction of the arrow III of FIG. 6;

FIG. 8 is a detailed, enlarged scale view, of the detail IV of FIG. 6;

FIGS. 9 and 10 are similar to FIGS. 4 and 5, but they illustrate an embodiment variant.

Figure 3:
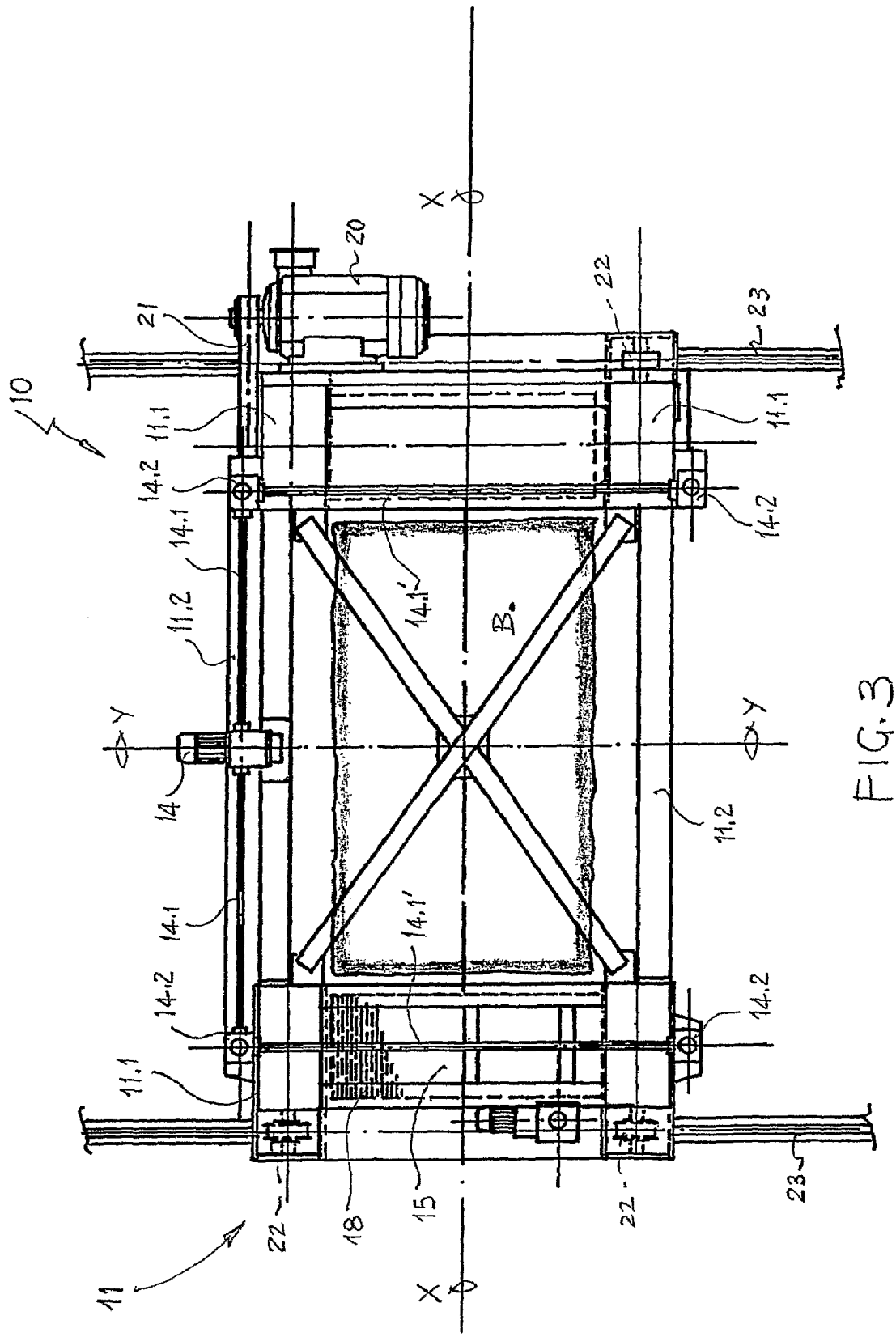

With reference to the drawings, the number 10 (FIGS. 1-3) globally designates the multiwire sawing machine for the cutting of material in block form, according to the present invention. Said sawing machine 10 comprises a double portal structure 11 in which is housed a plurality of cutting wire tools, as shall become more readily apparent hereafter.

Said double portal structure 11 includes two pairs of vertical uprights 11.1, each pair of uprights being joined at the top by means of a respective horizontal union cross member 11.2. In said structure are identified two vertical median planes of specular symmetry (FIG. 3): the transverse one X-X, parallel to the cross members 11.2, and the longitudinal one Y-Y orthogonal to the first.

Each upright 11.1 is formed by a pair of strong metallic columns 11.3 (FIGS. 1, 4, 5), parallelepiped shaped, with boxed body with uniform, substantially rectangular cross section, which are mutually opposite and distanced, in such a way that each upright 11.1 has a continuous vertical rectilinear central slit 11.4.

The uprights 11.1, symmetric in mirror fashion, in pairs, relative to the transverse vertical median plane X-X have the respective slits 11.4 aligned according to a direction that is parallel to the longitudinal vertical median plane Y-Y. Each face of said uprights 11.1 is parallel to one of said vertical median planes. On the opposite faces of the columns 11.3 of each uprights 11.1 are fastened two pairs of opposite vertical rectilinear guides 12 (FIGS. 4, 5). Within the slit 11.4 of each upright 11.1, a respective ram with box body 13 is mounted vertically slidable, by means of a plurality of pairs of idle rollers 13.1, coupled by rolling along said rectilinear guides 12. Said ram 13 slides in a plane that is parallel to said transverse vertical median plane X-X.

A first electrical gear motor set 14 (FIG. 3), reversible, is fastened relative to a cross-member 11.2 of the portal 11 and it has horizontal axis contained in said longitudinal vertical median plane Y-Y. It directly actuates in rotation a pair of first transmission shafts 14.1, horizontal and mutually opposite, supported along said cross-member 11.2 with their axis substantially orthogonal to said longitudinal vertical median plane Y-Y. By means of respective bevel gear pair kinematic assemblies 14.2 provided at the uprights 11.1 and situated at the ends of said cross member 11.2, two additional transmissions shafts 14.1', positioned in the same horizontal plane and with orthogonal axis relative to said first shafts 14.1, derive the motion therefrom and transmit it to further bevel gear pair kinematic assemblies 14.2 fastened to the top of the other two uprights 11.1.

A lead screw (not visible in the drawings) is supported rotatable in the slit 11.4 of each upright 11.1, along which it extends with its vertical axis, whilst it derives its rotating motion by means of a respective bevel gear pair kinematic assembly 14.2. Said lead screw is engaged by helical coupling in a corresponding nut screw (not shown in the drawings) fastened on the ram 13 slidable in the same upright 11.1 along said guides 12, so that the rotation of the gear motor 14 in one or in the other direction determines the corresponding vertical translation of said ram 13 towards or away from the cross member 11.2, in synchronism and in concurrent direction with the translations of the other three rams 13 along the respective uprights 11.1.

Each pair of rams 13 slidable in uprights 11.1 symmetrical in mirror fashion relative to the transverse vertical median plane X-X bears a respective first support shaft 15, supported with its axial ends between the lower parts of said rams and with its axis horizontal and parallel to said longitudinal vertical median plane Y-Y.

Vertical rectilinear guide means (e.g. a guide plate, not visible in the drawings) are provided on each ram 13, above said shaft 15. Along said guiding means provided on each ram 13, a respective slide 16 (FIG. 1) is mounted slidable in the vertical direction, parallel to said transverse vertical median plane X-X. Moreover, on each ram 13 is mounted a double-action pneumatic jack 17, whose cylinder is fastened to the ram 13 with its axis parallel to the vertical direction of sliding of the ram.

The piston rod of said jack 17 is connected relative to the slide 16, in such a way as to determine, by means of its extension and retraction strokes relative to the cylinder, corresponding strokes in the vertical direction towards and away from the slide 16 relative to the cross members 11. Each jack 17 is connected in sealed fashion in a respective pneumatic control circuit, branched relative to a source of pressurised air (known in itself and not shown).

By means of said arrangement, each pair of rams 13, bearing inferiorly a respective first support shaft 15, also bears a second support shaft 15, supported at its axial ends by means of the respective slides 16 and positioned overlying and with parallel axis relative to said first shaft.

Three of said support shafts 15 are fixed relative to the structure that bears them, whilst the fourth shaft 15, e.g. the one at the lower right in FIG. 1, is mounted rotatable relative to the structure that bears it.

On each of said three fixed support shafts 15 is mounted, by means of respective bearing, a plurality of idle coaxial wheels or pulleys with races 18 (e.g., seventy-two pulleys, only some of which are shown in the drawings), juxtaposed in packet fashion, whilst an even number of coaxial wheels or pulleys with races 18 is keyed on said fourth rotating support shaft 15, in such a way as to rotate integrally with the shaft itself, thereby constituting a corresponding packet of drive pulleys. Said pulleys 18 with races are so arranged that a same vertical plane, parallel to said transverse vertical median plane X-X, intersects the races of a set of four pulleys, comprising three idle or transmission pulleys 18, supported by three respective fixed shafts 15, and a drive pulley 18 integral with the fourth rotating shaft 15. Said pulleys 18 all have equal shape and size. On each of said sets of four pulleys 18 with coplanar races is wound a corresponding wire or cutting tool 19 in closed loop (FIGS. 4, 5. In the other figures, the cutting wires 19 are not shown for the sake of illustrative clarity).

The pair of rams 13 bearing the rotating shaft 15 with packet of drive pulleys 18 also supports, by means of a fixed support plate 20.1 (FIG. 2) external to the portal structure 11, an integral second electric gear motor set 20, whose output shaft has its axis parallel to that of said shaft 15. Said second gear motor set 20, when actuated, drives in rotation, through positive drive belt transmission means 21, said same rotating shaft 15 with related packet of drive pulleys 18. Through this arrangement, activating said gear motor 20, the cutting wires 19 are made to circulate continuously around the respective set of four pulleys 18, each in a respective vertical plane called "cutting plane" and parallel to the transverse vertical median plane X-X.

On the other hand, activating the first gear motor set 14, the transmission shafts 14.1, 14.1' are set in rotation and hence the four rams 13 slide synchronously in the same vertical direction (by rotation of the respective screws 15 co-operating with the corresponding nut screws 15.1) along the guides 12 in the respective uprights 11.1 of the portal structure 11, making each cutting wire 19 complete a work stroke or a return stroke, according to the direction of rotation of the motor, in said "cutting plane".

When a block B (FIGS. 1-3) of material to be cut is placed inside the span of the portal 11, on a convenient support means, each closed-loop cutting wire 19 is initially raised towards the cross member 11.2, with its lower horizontal branch not in contact relative to the block B. Subsequently, all cutting wires 19, made to circulate by means of the gear motor 20, are driven simultaneously to complete, by rotation of the gear motor 14, their downward work stroke, as described above, until each cutting wire 19 has completed with its lower branch a through cut in said block B according to the respective cutting plane, reaching the lower stroke-end position. After completing the cut, all the cutting wires 19 are driven to complete an inverse stroke to their raised resting position, by inverse rotation of the gear motor 14. The block B is thus cut into a plurality of plates with parallel faces.

Note that the aforesaid portal structure 11 is mounted on wheels 22, engaged by sliding along corresponding rail guides 23, which improves the productivity of the machine 10.

As is readily apparent from the above, each pair of rams 13 symmetrical in mirror fashion relative to said transverse vertical median plane X-X sustains a respective pair of support shafts 15 mounted with variable distance between centre-lines, by means of an appropriate travel of the respective slides 16 in the vertical direction. This arrangement enables to use the cutting wires 19 according to a closed loop geometry, variable according to the requirements of the cut to be executed and of the material to be cut, e.g. keeping the part that performs the cut appropriately oriented with respect to the piece to be cut, whilst it assures, on the other hand, a correct tensioning of the cutting wires 19 in closed loop, by tensioning means contained inside the uprights 11.1 of the double portal 11, i.e. within the footprint of the machine.

However, the aforesaid tensioning means act in equal measure on all cutting wires 19 wound in closed loop on the pulleys 18, without taking into account any differences between a cutting wire and the other in the respective arrangement and loop structure. To overcome this drawback, the machine 10 comprises a device for compensating the length of the cutting wires 19 wound in closed loop on the respective four coplanar pulleys 18 with races (FIGS. 4-7).

Said compensating device includes a support shaft 15, e.g. one of the three fixed shafts, which has two opposite flat faces 15.1 (FIG. 7), parallel to each other and relative to said longitudinal vertical median plane Y-Y. Correspondingly, the hub 18.1 of each pulley 18 borne by the shaft has a substantially slot-like central mounting hole 18.2, with two rectilinear, parallel opposite flanks 18.3 juxtaposed to slide in vertical direction against said parallel flat faces 15.1 of the shaft 15. The contour of said slot-like hole 18.2 has its greater axis vertical and with its length greater than the maximum dimension (diameter) of said shaft 15 in the vertical direction, so that said pulley 18 can complete a translation stroke in the same direction relative to the shaft 15. Moreover, said shaft 15 has, at each pulley 18 mounted thereon, a respective blind hole 15.2, e.g. radial, with vertical axis, open in the top area of its outer surface and substantially extended to the axis of the shaft 15 itself. In each hole 15.2 is mounted in fluid-tight fashion and with vertical axial sliding a corresponding thrust cylinder 24, whose length exceeds said translation stroke of the pulley 18 relative to the shaft 15. A continuous longitudinal hole 15.3 runs through said shaft 15 parallel to its axis and places in fluid communication said blind holes 15.2 with a source of pressurised fluid, external to said shaft 15 (known in itself and not illustrated). By means of said arrangement, before starting the cutting operation, when all the cutting wires 19 are wound on the respective pulleys 18, according to respective vertical cutting planes, a pressurised fluid, e.g. oil, is fed, through said longitudinal hole 15.3 of said shaft 15 and the corresponding radial holes 15.2, communicating with said longitudinal hole. The partial axial extension of each cylinder 24 from the respective hole 15.2 of the shaft 15 is thus obtained and, hence, by the thrust of said cylinder, the guided sliding in the vertical direction upwards of the corresponding pulley 18 relative to the shaft 15, within the limits of its said stroke relative to the shaft. Said sliding stops when the reaction applied by the respective cutting wire 19 wound in closed loop on said pulley 18 (and on the other three, coplanar thereto) equals the fluid pressure acting on said cylinder 24. The correct length compensation is thus achieved of the respective cutting wire 19, which is subjected to a slight tension, substantially similar in measure to that of all the other cutting wires 19. The fluid pressure in the aforesaid fluid circuit is kept constant, until the operation of the machine 10 is interrupted. As the fluid pressure in this circuit drops, the cylinders 24 are made to retract into the respective guiding holes 15.2 by the weight of the corresponding pulleys 18, which lower automatically until the top part of their slot mounting hole 18.2 bears against the shaft 15. In this latter condition, maintenance operations on the machine, e.g. the replacement of worn or broken cutting wires, can easily be performed.

Said compensation device is provided, for example at the fixed support shaft 15 above and to the left in FIG. 1.

The cutting wires 19 wound in closed loop on the respective pulleys 18 are then tensioned by means of the sleds 16 borne by the rams 13, operating as described above.

Moreover, the machine 10 also comprises a device for the rapid replacement of worn or damaged cutting wires 19, with other new cutting wires, already arranged in closed loop (FIGS. 4, 5).

Said device for the rapid replacement of the wires includes, for each support shaft 15, a support head 30 sustained by a respective ram 13 or sled 16 and selectively movable in the axial direction of the shaft, between an advanced working position, in which it engages and supports the end of the shaft 15 opposite thereto, and a rearward resting position, in which it disengages said end of the shaft, which is maintained in overhang by means of the opposite ram 13 or the sled 16, moving away from the end in order to provide a free passage between said end of the shaft 15 and said ram 13 or sled 16 for the possible extraction of a worn or damaged closed-loop cutting wire 19 and the introduction of a new closed-loop cutting wire 19. The four supporting heads 30 are sustained by the two rams 13 and respective sleds 16 positioned substantially in a same vertical plane, parallel to said transverse vertical median plane X-X.

Specifically, each supporting head 30 comprises a substantially cylindrical body 31, positioned axially slidable in a corresponding through hole 32 for guiding a respective ram 13 or sled 16, said hole 32 being axially aligned with respect to the shaft 15 sustained by said ram or said sled. Said cylindrical body 31 is, for example, prevented from rotating with respect to said hole 32 and it has a cone frustum shaped axial extension 33, normally engaged in the manner of a shutter, in a corresponding blind axial hole 15.4, provided at the opposite end of said shaft 15, thereby supporting the shaft itself (FIG. 4). Moreover, said cylindrical body 31 has a blind axial hole 31.1 open at its axial end opposite the shutter 33 and in which is fastened a coaxial nut screw 34. A coaxial lead screw 35 is engaged by helical coupling with respect to said nut screw 34, extends with one of its ends externally to said hole 31.1 and it is actuated, through said external end, in rotation by means of a third, reversible, electric gear motor set 36, supported fixed by said ram 13 or said sled 16. The rotation in opposite directions 35 of the gear motor 36 determines the corresponding rotation in opposite directions of the lead screw 35 and, hence, either the axial advancement of the head 30 relative to the guiding hole 32, until causing its shutter 33 to penetrate and remain in the corresponding seat 15.4 in the shaft 15 (working position), or the axial rearward motion of said head 30 with respect to the guiding hole 32, extracting the shutter 33 and moving it away from the seat 15.4 in the shaft 15 (resting position).

In this latter position of the head 30, a free passage is provided between the shaft 15 and the ram 13 or the sled 16 for the easy replacement of the cutting wires 19 arranged in closed loop. In FIG. 5, a curvilinear arrow f schematically illustrates a part of a cutting wire 19 undergoing replacement.

It will be noted that each pulley 18 has a plurality of contiguous external circumferential races 18.4, of equal width and depth, specifically three races in the illustrated example (FIGS. 7, 8). Said races 18.4 are arranged according to respective median planes, orthogonal to the axis of the pulley, mutually distanced according to a constant pitch or distance (p), which is substantially equal to a standard reference metric measurement for the thickness of the plates to be cut.

In the machine 10, two adjacent cutting wires 19 are wound each in closed loop on a respective assembly of four coplanar races 18.4 of different pulleys 18, so that the thickness of the plate cut by means of said two adjacent cutting wires 19 substantially corresponds to the value of said pitch (p) multiplied times the number of the free contiguous races 18.4 belonging to one or more pulleys 18 situated between said two adjacent cutting wires.

It will be observed that the arrangement of pulleys 18 with standardised multiple race can involve a single support shaft 15, e.g. the one that also has the device for compensating the cutting wires 19, whilst on the other support shafts can be mounted respective rollers or drums, having a plurality of standardised races corresponding to the races of said pulleys.

Naturally, numerous variants may in practice be made to what is described and illustrated solely by way of example herein, without thereby departing from the scope of the present invention and hence from the domain of the present industrial patent.

Thus, for example, in the device for compensating the cutting wires can be provided thrusting means subject, to determine the return stroke of the pulleys, not to the action of gravity by the own weight thereof, but to a return action exerted by means of suitable mechanical, hydraulic or pneumatic means. In this case, the disposition of the means for guiding the sliding and for thrusting the pulleys may also be oriented according to non vertical axes and planes.

On the other hand, FIGS. 9 and 10 illustrate an embodiment variant of the device for the rapid replacement of worn cutting wires in the machine 10.

In these figures, the parts similar to those of the device according to FIGS. 4 and 5 are indicated with the same reference numbers.

According to this variant, instead of the shaft 15 with solid section, in the machine 10 is provided a hollow shaft or a cylindrical drum shaft 25, supported coaxial relative to the support head 30 and related shutter 33. Said drum shaft 25, at its end opposite to said shutter 33, has a coaxial hub 26. Said hub 26 bears, with an intermediate bearing 28, an axial bushing 27, which is able to receive in shape coupling said same shutter 33, when the support head 30 is extended in its advanced working position (FIG. 10). Therefore, in said working position of the support head 30, the drum shaft 25 is free to rotate with the hub 26 relative to the bushing 27, which is integral and stationary with said support head 30.

In the rearward return position of said head 30 (FIG. 9), the drum shaft 25 is supported in overhand by means of the ram 13 or the sled 16 opposite the one that bears said support head. It is thus possible to replace a cutting wire F in simple and rapid fashion.

For the rest, the description provided with reference to FIGS. 4 and 5.

The invention claimed is:

1. A multiwire sawing machine for the cutting of material in block form, characterized:

in that it comprises a double portal structure (11), which includes two pairs of uprights (11.1), symmetrical in mirror fashion according to two vertical median planes of symmetry, one transverse (X-X) and the other one longitudinal (Y-Y);

in that each upright (11.1) has a continuous vertical rectilinear slit (11.4), whilst the uprights (11.1), symmetric in mirror fashion, in pairs, relative to said transverse vertical median plane (X-X) have the respective slits (11.4) aligned according to a direction that is parallel to said longitudinal vertical median plane (Y-Y);

in that, along said slit (11.4) of each upright (11.1), a respective ram (13) slides in a plane that is parallel to said transverse vertical median plane (X-X);

in that a first electric gear motor set (14), reversible, through kinematic means (14.1, 14.1', 14.2, lead screw/nut screw) determines, by its rotation in one or in the other direction, the corresponding vertical translation of each ram (13), in opposite directions, in synchrony and in motion concurrent with the translations of the other three rams (13) along the respective uprights (11.1);

in that each pair of rams (13) slidable along uprights (11.1) symmetrical in minor fashion relative to the transverse vertical median plane (X-X) bears a respective first support shaft (15, 25), supported at its axial ends between the lower parts of said rams and with its axis horizontal and parallel to said longitudinal vertical median plane (Y-Y);

in that each pair of rams (13) inferiorly bearing a respective first support shaft (15, 25), also bears a second support shaft (15, 25) supported at its axial ends by means of respective slide means (16) and positioned overlying and with parallel axis relative to said first shaft, said slide means (16) being selectively driven in translation (jack means 17) in the vertical direction along the respective rams (13);

in that at least one of said support shafts (15) is stationary, whilst at least one of said support shafts (15, 25) is mounted rotatable relative to the structure that bears it and is selectively driven in rotation by means of second electric gear motor set (20);

in that the stationary support shaft or shafts (15, 25) support each an idle roller or coaxial drum, respectively a plurality of idle coaxial wheels or pulleys (18), mutually juxtaposed in packet fashion, whilst said rotating support shaft (15, 25) bears a keyed coaxial roller or drum, respectively a packet of coaxial wheels or pulleys (18), in order to drive it in integral rotation; each roller or drum, respectively each packet of wheels or pulleys having a number of peripheral races at least equal to the number of wire cutting tools of the machine;

in that said rollers or drums, respectively said packets or wheels or pulleys (18) are positioned in such a way that a vertical plane, parallel to said transverse vertical median plane (X-X), intersects a set of four races provided on said rollers or drums and/or on said wheels or pulleys, whereof one is integral to said at least one rotating support shaft (15, 25);

in that around each of said sets of four coplanar races is wound a corresponding wire or cutting tool (19) in closed loop;

in such a way that, by activating said second gear motor set (20), the cutting wires (19) are made to circulate continuously around the respective set of four coplanar races, each cutting wire in a respective vertical plane, called "cutting plane", parallel to said transverse vertical median plane (X-X), whilst, activating said first gear motor set (14), said four rams (13) are made to slide in synchrony and in the same vertical direction, making each cutting wire (19) complete a work stroke or a return stroke, depending on the direction of rotation of said first gear motor set, in said "cutting plane", thereby cutting a block of material (B) into a plurality of plates with parallel faces; and in that each pair of rams (13) symmetrical in mirror fashion relative to said transverse vertical median plane (X-X) sustains a respective pair of support shafts (15, 25) mounted with variable distance between centerlines, by means of an appropriate travel of the respective slides (16) in the vertical direction, which enables to use the cutting wires (19) according to a closed loop geometry that is variable in relation to the requirements of the cut to be executed and of the material to be cut, and it assures a correct tensioning of the closed-loop cutting wires (19), by tensioning means contained within the machine.

2. The sawing machine as claimed in claim 1, in which at least one shaft (15, 25) supports a packet of idle coaxial wheels or pulleys (18), characterized in that it comprises a device for compensating the length of the cutting wires (19) wound in closed loop on the respective sets of four coplanar pulleys.

3. The sawing machine as claimed in claim 2, characterized:

in that said support shaft (15, 25) has two flat opposite faces (15.1), mutually parallel, whilst the hub (18.1) of each wheel or pulley (18) borne by the shaft has a substantially slot-like central mounting hole (18.2), with two rectilinear, parallel opposite flanks (18.3) juxtaposed to slide against said parallel flat faces (15.1) of the shaft (15, 25), said slot-like hole (18.2) enabling said pulley (18) to complete a translation stroke relative to the shaft (15, 25), in that said shaft (15, 25) has, at each wheel or pulley (18) mounted thereon, a respective blind hole (15.2) open on its outer surface and in which is mounted in fluid-tight fashion and with vertical axial sliding a corresponding thrust cylinder (24), whose length exceeds said translation stroke of the wheel or pulley (18) relative to the shaft (15, 25), and in that a continuous longitudinal fluid passage (15.3) runs through said shaft (15, 25) and places in fluid communication said blind holes (15.2) with a source of pressurized fluid, external to said shaft (15, 25), so that before starting the cutting operation, when all the cutting wires (19) are wound in closed loop on the respective coplanar races, according to respective vertical cutting planes, a pressurized fluid is fed through said longitudinal fluid passage (15.3) of said shaft (15, 25) and the corresponding holes (15.2), communicating with said longitudinal passage, determining the partial axial extension of each cylinder (24) from the respective hole (15.2) of the shaft (15, 25) and, hence, by the thrust of said cylinder, the guided sliding of the corresponding wheel or pulley (18) relative to the shaft (15, 25), within the limits of its said translation stroke relative to the shaft itself, sliding that is arrested when the reaction applied by the respective cutting wire (19) wound on said wheel or pulley (18) equals the fluid pressure acting on said cylinder (24), thereby achieving the correct compensation of the respective cutting wire (19), which is subjected to a slight tension, substantially similar in measure to that of all the other cutting wires (19).

4. The sawing machine as claimed in claim 3, characterized:

in that said support shaft (15, 25) has two planar opposite faces (15.1), parallel to each other and relative to said longitudinal vertical median plane (Y-Y), whilst the hub (18.1) of each pulley or wheel (18) borne by the shaft has a substantially slot-like central mounting hole (18.2), with two rectilinear, parallel opposite flanks (18.3) juxtaposed to slide in vertical direction against said parallel flat faces (15.1) of the shaft (15, 25), said slot-like hole (18.2) enabling said wheel or pulleys (18) to complete a translation stroke in the vertical direction relative to the shaft (15, 25), in that said shaft (15, 25) has, at each wheel or pulley (18) mounted thereon, a respective blind hole (15.2), with vertical axis, open in the top region of its outer surface and in which is mounted in fluid-tight fashion and with vertical axial sliding a corresponding thrust cylinder (24), whose length exceeds said translation stroke of the pulley (18) relative to the shaft (15, 25), and in that a continuous longitudinal fluid passage (15.3) runs through said shaft (15, 25) and places in fluid communication said blind holes (15.2) with a source of pressurized fluid, external to said shaft (15, 25), so that before starting the cutting operation, when all the cutting wires (19) are wound in closed loop on the respective coplanar races, according to respective vertical cutting planes, a pressurized fluid is fed through said longitudinal fluid passage (15.3) of said shaft (15, 25) and the corresponding holes (15.2), communicating with said longitudinal passage, determining the partial axial extension of each cylinder (24) from the respective hole (15.2) of the shaft (15, 25) and, hence, by the thrust of said cylinder, the guided sliding of the corresponding wheel or pulley (18) relative to the shaft (15, 25), within the limits of its said translation stroke relative to the shaft itself, sliding that is arrested when the reaction applied by the respective cutting wire (19) wound on said wheel or pulley (18) equals the fluid pressure acting on said cylinder (24), thereby achieving the correct compensation of the respective cutting wire (19), which is subjected to a slight tension, substantially similar in measure to that of all the other cutting wires (19), whilst when the fluid pressure in said circuit drops, the cylinders (24) are made to retract in the respective guiding holes (15.2) by the weight of the corresponding wheels or pulleys (18), which lower automatically until the top part of their slat-like mounting hole (18.2) bears against the shaft (15, 25).

5. The sawing machine as claimed in claim 3, characterized in that said device for compensating the length of the cutting wire comprises means for returning each wheel or pulley (18) to the resting position, when the fluid pressure acting on the respective cylinder (24) ceases.

6. The sawing machine as claimed in claim 1, characterized in that it comprises, for each support shaft (15, 25), a support head (30) sustained by a respective ram (13) or sled (16) and selectively movable in the axial direction of the shaft, between an advanced working position, in which it engages and supports the end of the shaft (15, 25) opposite thereto, and a rearward resting position, in which it disengages said end of the shaft, which is maintained in overhang by means of the opposite ram (13) or sled (16), moving away from the end in order to provide a free passage between said end of the shaft (15, 25) and said ram (13) or sled (16) for the possible extraction of a worn or damaged closed-loop cutting wire (19) and the introduction of a new closed-loop cutting wire (19).

7. The sawing machine as claimed in claim 6, characterized in that the four support heads (30) are sustained by the two rams (13) and respective sleds (16) positioned substantially in a same vertical plane, parallel to said transverse vertical median plane (X-X).

8. The sawing machine as claimed in claim 6, characterized in that each supporting head (30) comprises a substantially cylindrical body (31), positioned axially slidable in a corresponding through hole (32) for guiding a respective ram (13) or sled (16), said hole (32) being axially aligned with respect to the shaft (15, 25) sustained by said ram or said sled, in that said cylindrical body (31) has an axial extension (33), normally engaged in the manner of a shutter in a corresponding axial seat (15.4, 27) provided at the opposite end of said shaft (15, 25), thereby supporting the shaft itself, and in that said cylindrical body (31) has a blind axial hole (31.1) open at Its axial end opposite the shutter (33) and in which is fastened a coaxial nut screw (34), whilst a lead screw (35) is engaged by helical coupling relative to said nut screw (34), extends with one of its ends externally to said hole (31.1) and is driven, by means of said external end, in rotation by means of a third electric gear motor set (36), reversible, supported fixed by said ram (13) or said sled (16), so that the rotation in inverse directions of the gear motor (36) determines the corresponding rotation in inverse directions of the lead screw (35) and, hence, either the axial advancement of the head (30) relative to the guiding hole (32), until making its shutter (33) penetrate and remain in the corresponding seat (15.4, 27) in the shaft (15, 25), working position, or the axial rearward motion of said head (30) relative to the guiding hole (32), extracting and moving the shutter (33) away from the seat (15.4) in the shaft (15, 25), resting position, in which between the shaft (15, 25) and the ram (13) or the sled (16) a free passage is provided for the easy replacement of the cutting wires (19) arranged in closed loop.

9. The sawing machine as claimed in claim 6, characterized in that said shaft (25) is hollow or drum-like and, at its end opposing said shutter (33), it has a coaxial hub (26), which bears, with an intermediate bearing (28), an axial bushing (27), provided to receive in shape coupling said same shutter (33), when the support head (30) is extended in its advanced working position, so that, in said working position of the support head (30), the drum shaft (25) is free to rotate with the hub (26) relative to the bushing (27), which is integral and stationary with said support head (30).

10. The sawing machine as claimed in claim 1, in which at least one shaft (15, 25) supports a packet of coaxial wheels or pulleys (18), characterized in that each pulley (18) has a plurality of contiguous external circumferential races (18.4), of equal width and depth, arranged according to respective median planes, orthogonal to the axis of the pulley and mutually distanced according to a constant pitch or distance (p), which is substantially equal to a standard reference metric measurement for the thickness of the plates to be cut.

11. The sawing machine as claimed in claim 10, characterized in that two adjacent cutting wires (19) are wound each in closed loop on a respective assembly of four coplanar races (18.4) of different pulleys (18), so that the thickness of the plate cut by means of said two adjacent cutting wires (19) substantially corresponds to the value of said pitch (p) multiplied times the number of the free contiguous races (18.4) belonging to one or more pulleys (18) situated between said two adjacent cutting wires.

12. The sawing machine as claimed in claim 10, characterized in that each pulley (18) has three contiguous races (18.4).

\* \* \* \* \*